United States Patent
Cho

(10) Patent No.: US 8,155,352 B2
(45) Date of Patent: Apr. 10, 2012

(54) SERIALIZER FOR MULTIPLE APPLICATIONS

(75) Inventor: Jongsoo Cho, Seoul (KR)

(73) Assignee: Fairchild Korea Semiconductor Ltd, Gyeonggi-do (KP)

( * ) Notice: Subject to any disclaimer, the term of this patent is extended or adjusted under 35 U.S.C. 154(b) by 904 days.

(21) Appl. No.: 12/180,825

(22) Filed: Jul. 28, 2008

(65) Prior Publication Data

US 2009/0034757 A1   Feb. 5, 2009

Related U.S. Application Data

(60) Provisional application No. 60/953,612, filed on Aug. 2, 2007.

(51) Int. Cl.
*H03F 99/00* (2009.01)

(52) U.S. Cl. .................................. 381/120; 455/550.1
(58) Field of Classification Search .................. 381/120; 455/550.1
See application file for complete search history.

(56) References Cited

U.S. PATENT DOCUMENTS 7,729,389 B1 *   6/2010   Lo ................................ 370/535
2007/0087777 A1 *   4/2007   Shibuya et al. ............ 455/550.1

* cited by examiner

*Primary Examiner* — Steven J Fulk
(74) *Attorney, Agent, or Firm* — Cesari and McKenna, LLP

(57) ABSTRACT

A serializer/deserializer interfaces a microprocessor/controller with I/O devices over a flexible hinging cable. The I/O devices have parallel interfaces as does the controller but the serializer/deserializer reduces the number of signal that traverse the flexible hinging cable. LCD displays, cameras, keypads and audio signals handled by the invention.

8 Claims, 2 Drawing Sheets

SERIALIZER FOR MULTIPLE APPLICATIONS

RELATED APPLICATIONS

The present application is related to and claims the benefit of the Provisional Application Ser. No. 60/953,612; filed Aug. 2, 2007, of common title, inventorship and ownership as the present application. This provisional application is incorporated herein by reference.

The present application is also related to the following commonly owned applications that are incorporated herein by reference:

1. "Method and Circuit for Interleaving, Serializing and Deserializing Camera and Keypad Data," application Ser. No. 12/112,136, filed Apr. 30, 2008, by James B. Boomer and Oscar W. Freitas;

2. "Method a Circuit of Changing Modes Without Dedicated Control Pin," application Ser. No. 12/112,152, filed Apr. 30, 2008, by James B. Boomer, Oscar W. Freitas, and Steven M. Macaluso;

3. "Method and Circuit for Capturing Keypad Data, Serializing and Deserializing and Regenerating the Keypad Interface," application Ser. No. 12/112,176, filed May 3, 2008, by James B. Boomer and Oscar W. Freitas; and 4. "Methodology and Circuit for Interleaving and Serializing/Deserializing LCD, Camera, Keypad, and GPIO Data Across a Serial Stream," application Ser. No. 12/180,993, filed Jul. 28, 2008, by James B. Boomer, Oscar Freitas, and Steven Macaluso.

BACKGROUND OF THE INVENTION

1. Field of the Invention

The present invention relates to multiplexing, and serializing/deserializing data from a number of devices across a serial interface, and more particularly to serializers/deserializers found in hand held devices.

2. Background Information

Typically hand held devices include serializers/deserializers that support only a two devices, e.g. an LCD display and a camera.

It would be advantageous if the serializer/deserializer supported I/O (input/output) devices that include an LCD display, a camera, and keypad matrix and an audio processor. These I/O devices, like many microprocessors, typically have parallel interfaces. In mobile devices, however, some I/O devices are separated by a flexible cable hinge from a controller microprocessor.

It would be advantageous if a serializer/deserializer provided the interface between a microprocessor and the above I/O devices. A serializer/deserializer reduces the number of wires that must traverse the flexible cable hinge found in many hand held devices, and reducing the number of signal wires or lines across the hinge improves, at least, reliability, cost and noise.

For example for a typical hand held cell phone, there may be as many as 44 signal wires that traverse the flexible cable hinge between the moving (sliding, folding) part and the microprocessor part of a hand held device. For example, the LCDs (main and sub) may have 22 lines, a camera may have 12 lines; the keypad 7 lines and audio processor 3 lines, or 44 lines total.

It would be advantageous to reduce the number of physical wires that traverse the hinge of a folding or sliding mobile phone. Serialization provides one level of wire reduction.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
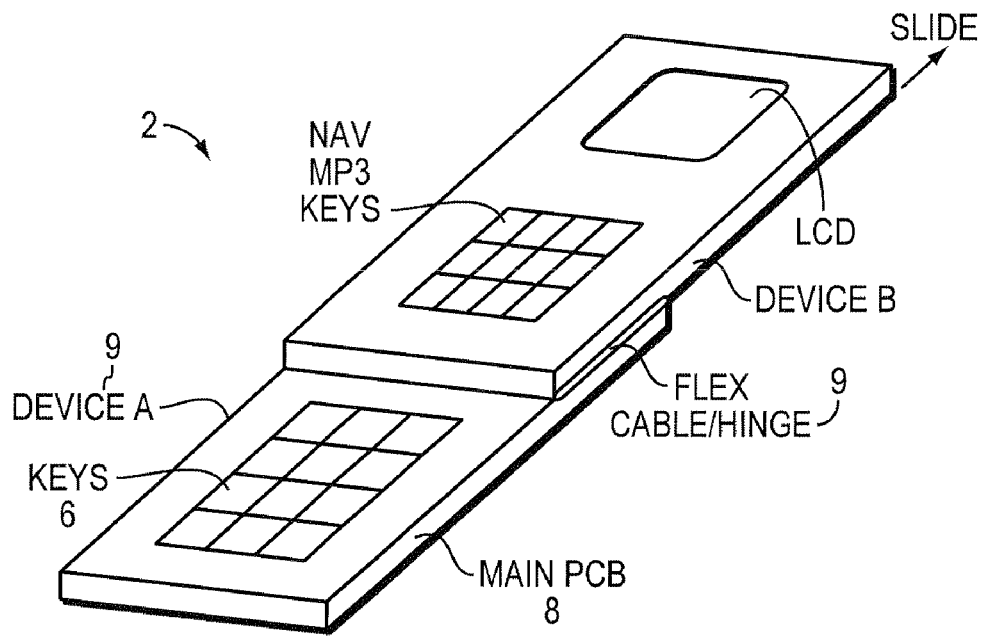
FIG. 1 is a pictorial of hand held devices.

FIG. 1 illustrates a sliding cell phone hand held device 2. The top part, device B, moves with respect to the main, device A part. A flexible cable 9 provides the hinge between the two. In most cases there is a keypad 6 on device A and smaller keypad having navigation/MP3 keys and an LCD display on device B. Often on the folding hand held phones there are two LCD displays: a main LCD viewed when the folding phone is opened, and a subordinate LCD viewed when the folding phone is closed. The main printed circuit board (PCB) is housed in device A along with a battery.

Figure 2:
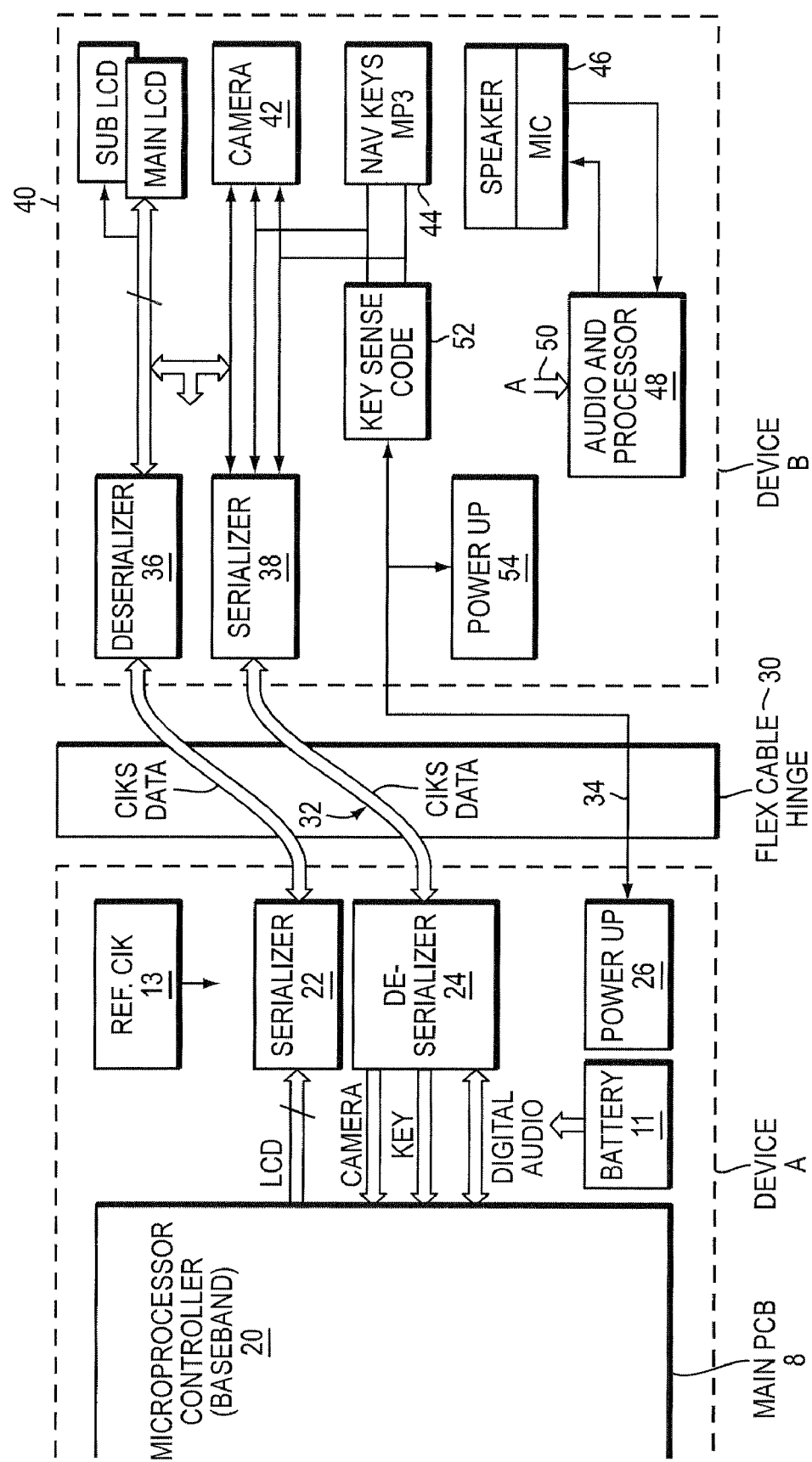
FIG. 2 is a schematic block diagram illustrating one embodiment.

FIG. 2 illustrates the main circuit blocks and their functions. Device A contains, inter alia, a battery 11 and a main PCB 8 that mounts a microprocessor 20, a reference clock 13, REF.CLK, a serializer 22, a deserializer 24, and power up circuitry 26. A flexible cable 30 carries signal lines between device A and B. In one embodiment, clocks and data lines 32 may number six to eight signals, and one power-up signal 34.

Device B has a deserializer 36 and a serializer 38 that receive signals from the serializer 22 and deserializer 24, respectively, across the flex cable 30. The main and subordinate LCD displays 40 receive parallel data from the deserializer 36. Parallel data from the camera 42 and the navigation keys/MP3 keys 44 are fed to and serialized by the serializer 38. A key sense and code circuit 52 control the multiplexing of the NAV/KEY/MP3 key signals and the camera 42 signals. As would be known to those skilled in the art, the source (camera or key) of the data signals and the data signals are input, via the flex cable, to the deserializer 24 and the microprocessor 20 for processing.

A power up signal emanates from any key activation on device B. When any key is depressed the Key Sense/Code 52 block recognizes it and signals the rest of device B to power up. A line 34 from device B signals device A to turn on. This save batter power by allowing only a small quiescent current to be drawn while awaiting a key to be activated.

Figure 3:
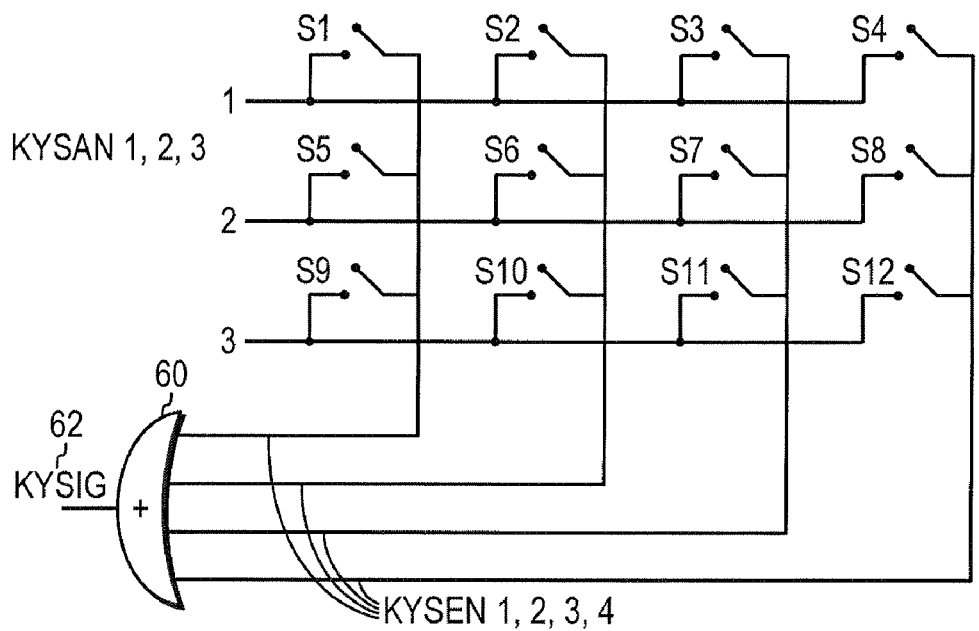
FIG. 3 illustrates a matrix arrangement for a keypad.

FIG. 3 illustrates the keypad matrix of twelve keys used for navigation, MP3, soft key selection and control. Seven lines, KYSAN1, 2,3 and KYSEN 1, 2, 3 and 4 share seven of the twelve lines from a camera to the serializer 38. The seven keypad lines constitute three scan lines and four sense lines. An OR circuit 60 detects when any key is depressed and outputs KYSIG signal 62 to the other electronics to power up (as described above).

In some applications the keypad data may be interleaved with the camera video signals. For example, during the horizontal and/or vertical synchronization signals from the camera, no camera data is being sent from the camera. During these times keypad data may be sent.

An audio receiver and second microphone (for camcorder mode) 46 may be found in Device B. There will usually be one line connecting to a microphone and three lines for stereo audio. The three lines are used for stereo(R/L/M) and one for the microphone. Only two lines are needed for mono-audio and the microphone. In any event these signals are processed in the audio amp/processor.

The audio data, preferably, is formatted using the I2S and three signal wires. I2S format has been in use for many years and is known to those skilled in the art. Briefly, the three lines are: a serial clock signal (SCK), a word select (WS), and serial data (SD).

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A serializer/deserializer comprising:
   an audio amplifier and processor arranged to interface, at least, with a microphone and a speaker;
   a deserializer arranged to receive first serial signals and to output first parallel signals to displays and to the audio amplifier and processor;
   a serializer arranged to input second parallel signals from a keypad matrix of multiple keys, cameras, and the audio amplifier and processor, and to output second serial signals;
   wherein the audio amplifier and processor interfaces with the serializer and the deserializer to send and to receive parallel data therefrom;
   a flexible cable arranged to carry signals to and from a second system, wherein the first serial signals are carried to the deserializer via the flexible cable, and the second serial data signals are carried from the serializer via the flexible cable,
   a key sense circuit that outputs a first signal when any one of the multiple keys is depressed; and
   a first power up circuit that detects the first signal and outputs a power up signal that turns on power to the serializer/deserializer.

2. The serializer/deserializer of claim 1 wherein the second system comprises:
   a second deserializer arranged to receive the second serial signals from the flexible cable and recreate and output third parallel signals to a computer system;
   a second serializer arranged to input fourth parallel signals from the computer system and to send the first serialized signals to the flexible cable,
   wherein the first power up circuit sends the power up signal to the flexible cable, and
   a second power up circuit arranged to receive the power up signal from the flexible cable and power up the second system.

3. The serializer/deserializer of claim 1 wherein the audio amplifier and processor employs the I2S code.

4. The serializer/deserializer of claim 1 wherein the key sense circuit interleaves the keypad data and the camera data, by detecting when the camera is not sending data and during that time sending keypad data.

5. A process for serializing/de-serializing data, the process comprising the steps of:
   amplifying and processing audio data to and from, at least, a microphone and a speaker;
   deserializing first serial signals and outputting first parallel signals to displays and to an audio amplifier and processor;
   serializing input second parallel signals from a keypad matrix of multiple keys, cameras, and the audio amplifier and processor, and outputting second serial signals;
   carrying first serial signals to the deserializer via the flexible cable, and carrying second serial data signals from the serializer via the flexible cable,
   sensing when any one of the multiple keys on the keypad is depressed; and
   powering up circuitry when any of the multiple keys is depressed.

6. The process of claim 5 further comprising the steps of:
   second de-serializing the second serial signals from the flexible cable and recreating and outputting third parallel signals to a computer system;
   second serializing fourth parallel signals from the computer system and sending the first serialized signals to the flexible cable,
   sending the power up signal to the flexible cable, and
   receiving the power up signal from the flexible cable and powering up the second system.

7. The process of claim 5 further comprising the step of encoding the audio signal with an I2S code.

8. The process of claim 5 further comprising the steps of:
   interleaving the keypad data and the camera data, by detecting when the camera is not sending data and during that time sending keypad data.

\* \* \* \* \*